(12) United States Patent
Kubicko et al.

(10) Patent No.: US 6,288,516 B1
(45) Date of Patent: Sep. 11, 2001

(54) FOOD PROCESSOR MOTOR CONTROLLER

(75) Inventors: Robert Kubicko, Southbury; Theodore B. Mulle, New Milford, both of CT (US); Asik Braginsky, Forest Hills, NY (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 09/474,288

(22) Filed: Dec. 29, 1999

(51) Int. Cl.[7] .................................................. H02P 5/28
(52) U.S. Cl. ........................ 318/772; 318/811; 318/701; 318/785
(58) Field of Search ........................... 318/750–760, 318/778, 781, 786, 799, 785, 823, 758, 762, 779; 388/810–818, 936, 907.5, 904; 366/206, 601

(56) References Cited

U.S. PATENT DOCUMENTS

| | | | |
|---|---|---|---|
| 3,678,360 | 7/1972 | Minarik et al. | 318/332 |
| 3,765,870 | 10/1973 | Morton et al. | 318/39 |
| 3,882,364 | * 5/1975 | Wright et al. | 318/221 R |
| 4,241,302 | * 12/1980 | Benjamin | 318/758 |
| 4,382,217 | * 5/1983 | Horner et al. | 318/778 |
| 4,395,670 | * 7/1983 | Podell | 318/758 |
| 4,453,118 | * 6/1984 | Phillips et al. | 318/779 |
| 4,673,860 | 6/1987 | Machuron | 318/812 |
| 4,691,870 | 9/1987 | Fukunaga et al. | 241/36 |
| 4,764,714 | * 8/1988 | Alley et al. | 318/786 |
| 4,804,901 | * 2/1989 | Pertessis et al. | 318/786 |
| 4,823,067 | 4/1989 | Weber | 318/799 |
| 4,893,067 | 1/1990 | Bhagwat et al. | 388/817 |
| 5,159,255 | * 10/1992 | Weber | 318/775 |
| 5,276,392 | 1/1994 | Beckerman | 318/751 |
| 5,296,795 | * 3/1994 | Dropps et al. | 318/778 |
| 5,347,205 | * 9/1994 | Piland | 318/811 |
| 5,528,120 | * 6/1996 | Brodetsky | 318/785 |
| 5,844,343 | * 12/1998 | Horst | 310/184 |
| 5,883,488 | 3/1999 | Woodward | 318/786 |
| 5,973,473 | * 10/1999 | Anderson et al. | 318/785 |
| 6,034,503 | * 3/2000 | Pertessis | 318/785 |

* cited by examiner

*Primary Examiner*—Paul Ip
(74) *Attorney, Agent, or Firm*—Ohlandt, Greeley, Ruggiero & Perle, LLP

(57) ABSTRACT

A food processor with a motor control that disables speed regulation during motor start operation and high torque operation. Whenever motor speed is less than a set speed, both a motor starter winding and a main winding are energized without speed regulation. When the motor speed is equal to or greater than the set speed, the starter winding is disconnected and a voltage controller is enabled to control motor speed. During high torque conditions, the motor speed oscillates between set speed and a lower speed as the starter winding and the voltage controller are alternately switched in and out of the motor control circuit.

12 Claims, 1 Drawing Sheet

FOOD PROCESSOR MOTOR CONTROLLER

FIELD OF THE INVENTION

This invention relates to a food processor and, in particular, to a motor controller and to a method for controlling an induction motor for both normal loading tasks and for heavy loading tasks.

DESCRIPTION OF THE ART

Food processors typically include an electrical motor that drives an impeller with blades disposed in a container for processing food items. When the food items present a heavy load on the impeller, the motor speed declines enough that the motor may stall. To compensate, prior art food processors have used a voltage controller that responds to a higher loading or torque by increasing the current or voltage applied to the motor. For example, U.S. Pat. No. 4,673,860 discloses a motor controller for a food processor that controls motor speed regardless of load or torque fluctuations by increasing the electrical current or voltage applied to the motor.

U.S. Pat. No. 4,691,870 discloses a food processor in which motor speed is controlled with a motor speed detector that senses a counter electromotive force (emf) of the field winding, the counter emf being proportional to motor speed.

Some food processors have used an induction motor as its speed/torque characteristic is such that the motor will not stall when processing food items, such as vegetables. The induction motor is said to have normal loading and typically operates with a motor speed in a range of about 1,780 rpm to about 1,450 rpm. However, the induction motor stalls at about 1,450 rpm when processing food items that create heavy loading.

An object of the present invention is to provide a food processor motor controller that, during heavy loading, allows the motor to operate without stalling over substantially the same torque range as for normal loading.

Another object of the present invention is to provide a method of operating a food processor motor that, during heavy loading, allows the motor to operate without stalling over substantially the same torque range as for normal loading.

SUMMARY OF THE INVENTION

A food processor according to the present invention has an induction motor coupled to an impeller. The induction motor has a main winding and a starter winding. A motor controller has a motor speed detector coupled to the motor to produce a speed signal proportional to motor speed. A voltage controller, when enabled, controls electrical energy delivered to the motor's main winding to control the speed of the motor. When the motor speed is less than a set speed, a signal processing circuit connects the starter and main windings in circuit with an electrical power source and disables the voltage controller. When the motor speed is equal to or greater than the set speed, the signal processing circuit disconnects the starter winding from the electrical power source and enables the voltage controller. Thus, the motor is energized by the starter and main windings during motor start operations and during high torque conditions in which the motor speed declines below the set speed.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE INVENTION

Figure 1:
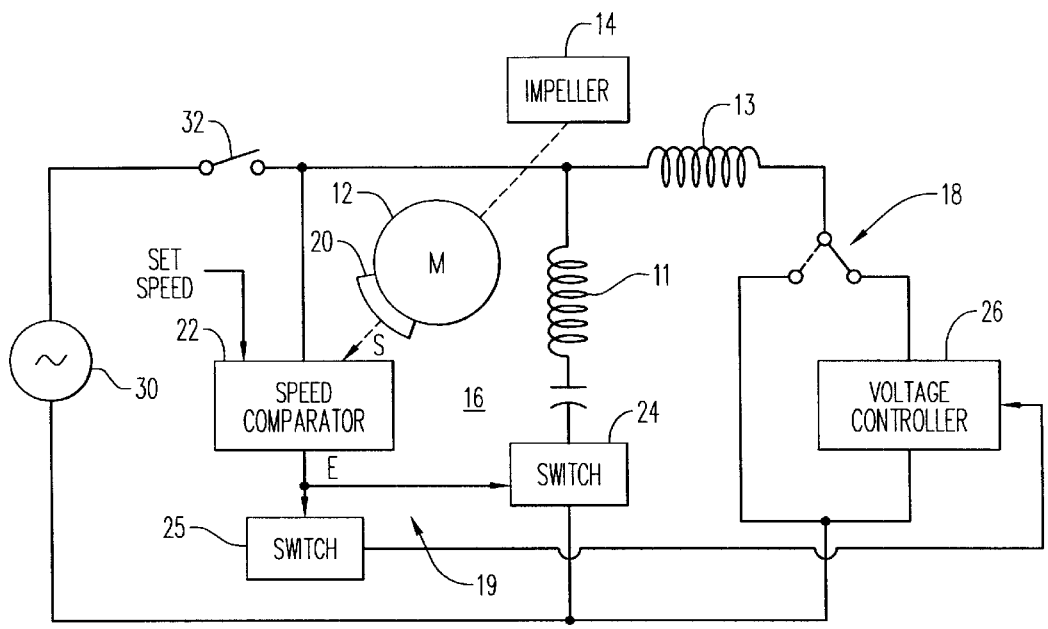
FIG. 1 is a schematic diagram of a food processor according to the present invention.

Referring to FIG. 1, a food processor 10 includes a motor 12, an impeller 14 and a motor controller 16. Motor 12 includes a starter winding 11 and a main winding 13. Motor controller 16 controls the energy delivered to starter winding 11 and main winding 13 to operate motor 12 to drive impeller 14 to process food items. Impeller 14 typically includes blades for slicing, chopping or mixing food items.

Motor controller 16 includes a motor speed detector 20, a signal processing circuit 19, a voltage controller 26, and a load mode selector 18. Signal processing circuit 19 includes a speed comparator 22, a switch 24 and a switch 25. Motor speed detector 20 senses the speed of motor 12 and provides a motor speed signal S to speed comparator 22. Speed comparator 22 compares motor speed signal S with a set speed reference and produces an error signal E. Error signal E controls the opening and closing of switches 24 and 25. When error signal E is less than the set speed, switch 24 is closed to connect starter winding 11 with an electrical a.c. power source 30 and a line switch 32. A capacitor 28 is connected in series with starter winding 11 to provide a phase shift relative to the a.c. power applied through main winding 13.

Load mode selector 18 has a normal load (high speed) position and a heavy load (lower speed) position shown by the dashed and solid lines, respectively. For example, normal loads include processing of vegetables and heavy loads include mixing of bread dough. When in the normal load position, load mode selector 18 connects main winding 13 in circuit with electrical power source 30. When in the heavy load position, speed selector 18 connects voltage controller 26 in circuit with electrical power source 30 and main winding 13. Voltage controller 26 applies a lower voltage to main winding 13 than the voltage of the a.c. voltage supplied by electrical power source 30.

Figure 2:
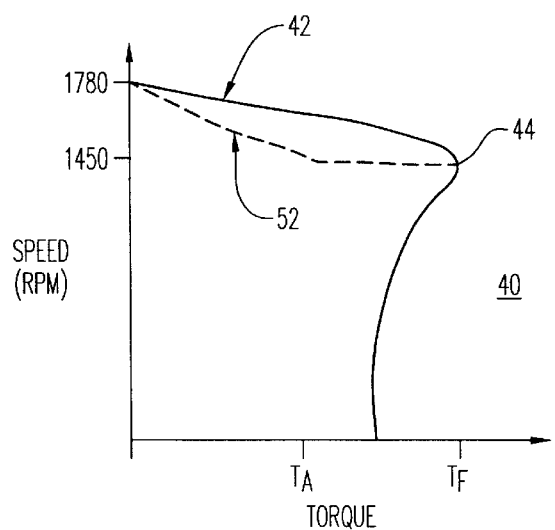
FIG. 2 is a graph of the motor speed/torque characteristic for the motor of the FIG. 1 food processor.

Referring to FIG. 2, there is shown a speed v. torque graph 40 with a speed/torque curve 42 for normal load operation and a speed/torque curve 52 for heavy load operation of food processor 10. Speed/torque curves 42 and 52 share a knee 44 at a full torque $T_F$ and a motor speed of approximately 1,450 rpm. The set speed is preferably the motor speed at knee 44 or approximately 1,450 rpm. As speed/torque curve 52 is lower than curve 42 for the motor speed range between 1,450 and 1,780 rpm, the heavy load speed is lower for a given torque than for normal load operation along curve 42.

When line switch 32 is initially closed, error signal E closes switch 24, thereby connecting starter winding 11 to electrical power source 30. If load mode selector switch 18 is in the normal load mode, main winding 13 is also connected to electrical power source 30. Motor 12 accelerates. When motor speed attains the set speed of 1,450 rpm, error signal E is zero, switch 24 opens to disconnect starter winding 11 from electrical power source 30. Motor 12 continues to accelerate as motor speed rounds knee 44 and increases to a speed between 1,450 and 1,780 rpm dependent on the load or torque on impeller 14. For normal load operation, the loading is typically between zero and full torque $T_F$ and motor speed varies in the range between 1,450 and 1,780 rpm along curve 42.

When load mode selector 18 selects the heavy load mode and line switch 32 is closed, motor controller 16 operates motor 12 along speed/torque curve 52. Error signal E closes switch 24, thereby connecting starter winding 11 to electrical power source 30. Switch 25 is open. This disables voltage controller 26, but connects main winding 13 to electrical power source 30. Motor 12 accelerates. When motor speed attains the set speed of 1,450 rpm, error signal E is zero, switch 24 opens to disconnect starter winding 11 from electrical power source 30. Switch 25 closes to enable voltage controller 26 to control motor speed. If the torque is between full torque $T_F$ and a lesser torque $T_A$, motor speed is 1,450 rpm. If the torque declines below $T_A$, motor speed rises above 1,450.

If impeller 14 is loaded with full torque $T_F$, error signal E closes switch 24 and opens switch 25 so as to connect electrical power source 30 to windings 11 and 13 with voltage controller 26 being disabled. As motor 12 accelerates and motor speed attains the set speed of 1,450 rpm, switch 24 opens and switch 25 closes. Voltage controller 26 again applies a lower voltage to main winding 13. If the torque continues at full torque $T_F$, switches 24 and 25 close and open again and motor 12 again accelerates to the set speed of 1,450 rpm. So long as the torque remains at full torque, error signal E operates switches 24 and 25 so that motor speed oscillates between set speed of 1,450 rpm and a lower speed. As the dough becomes more pliable and loading decreases, motor speed stays at 1,450 rpm or above along curve 52.

It will be apparent to those skilled in the art that speed regulation can be added to food processor 10 by simply sensing the current flow in main winding 13 to obtain a feedback signal to control the amplitude of the voltage output of voltage controller 26.

It will also be apparent to those skilled in the art that component selection for motor 12 and motor controller 16 is a matter of choice and design. For example, motor 12 may be any suitable induction motor. Switches 24 and 25 may be triacs. Speed detector 20 may be any device that produces a speed signal proportional to motor speed, such as a tachometer, a Hall effect transducer and the like. Speed comparator 22 may be any device that converts speed signal to a form that it can compare with the set speed, such as voltages, digital values, and the like. Voltage controller 26 may be any device that controls the current or voltage delivered to main winding 13, such as a switch that controls rms voltage by phase angle chopping of the a.c. power. Electrical power source 30 is, for example, a typical a.c. power mains available as 110 volts, 60 Hz.

The present invention having been thus described with particular reference to the preferred forms thereof, it will be obvious that various changes and modifications may be made therein without departing from the spirit and scope of the present invention as defined in the appended claims.

What is claimed is:

1. A food processor having an induction motor coupled to an impeller, the induction motor having a main winding and a starter winding, a motor controller connected with the starter winding and the main winding, said motor controller comprising;
    a motor speed detector coupled to the motor to produce a speed signal proportional to the speed of the motor; and
    a signal processing circuit responsive to the speed signal to perform the steps of (a) connecting the starter and main windings in circuit with a source of electrical power if the motor speed is less than a set speed and (b) disconnecting the starter winding from the source of electrical power if the motor speed is equal to or greater than the set speed, wherein the motor is energized by the starter and main windings during motor start operations and during high torque conditions in which the motor speed declines below the set speed and is energized by the main winding when the motor speed is equal to or greater than the set speed.

2. The food processor of claim 1, further comprising:
    a voltage controller that, when enabled, controls electrical energy delivered to the main winding to control the speed of the motor; and
    wherein step (a) further disables the voltage controller if the motor speed is less than a set speed and step (b) further enables the voltage controller if the motor speed is equal to or greater than the set speed.

3. The food processor of claim 2, the signal processor circuit alternately performs steps (a) and (b) during the high torque condition as the motor speed oscillates in a range between the set speed and a lower speed.

4. The food processor of claim 3, wherein the set speed is approximately 1,450 rpm.

5. The food processor of claim 4, wherein the signal processor includes a comparator that compares the speed signal with a set speed reference to produce an error signal, a first switch responsive to the error signal to connect the starter winding in circuit with the electrical power source and a second switch responsive to the error signal to enable and disable the voltage controller.

6. The food processor of claim 5, wherein the first and second switches are triacs.

7. The food processor of claim 6, further comprising a load mode selector having first and second positions, when the load mode selector is in the first position, the signal processing circuit performs steps (a) and (b), and when the load mode selector is in the second position, the voltage controller is disconnected, the main winding is connected in circuit with the source of electrical power and the signal processing circuit connects the starter winding in circuit with the source of electrical power whenever the motor speed is less than the set speed.

8. A method of operating a food processor having an induction motor with a main winding and a starter winding, said method comprising:
    (a) detecting the speed of the motor;
    (b) when the motor speed is less than a set speed, connecting the starter and main windings in circuit with an electrical power source; and
    (c) when the motor speed is equal to or exceeds the set speed, disconnecting the starter winding from the electrical power source, wherein the motor is energized by the starter and main windings during motor start operations and during high torque conditions in which the motor speed declines below the set speed and is energized by the main winding when the motor speed is equal to or greater than the set speed.

9. The method of claim 8, wherein the food processor further includes a voltage controller that, when enabled, controls the speed of the motor, wherein step (b) further disables the voltage controller when the motor speed is less than the set speed, and wherein step (c) further enables the voltage controller when the motor speed is equal to or exceeds the set speed.

10. The method of claim 9, wherein steps (b) and (c) are repeated during a high torque condition, thereby oscillating the motor speed in a range between the set speed and a lower speed.

11. The method of claim 10, wherein the set speed is approximately 1,450 rpm.

12. The method of claim 11, wherein the food processor further includes a load mode selector that selects a heavy load mode or a normal load mode, wherein steps (a) through (c) are performed during the heavy load mode, and wherein step (a) and the following steps are performed during the normal load mode:

(d) disconnecting the voltage controller;
(e) connecting the main winding in circuit with the electrical power source;
(f) connecting the starter winding in circuit with the electrical power source whenever the motor speed is less than the set speed.

\* \* \* \* \*